April 15, 1924.
E. P. FORD
1,490,100
MACHINE FOR TREATING OR PROCESSING FABRICS AND OTHER GOODS
Filed Dec. 12, 1919
6 Sheets-Sheet 1
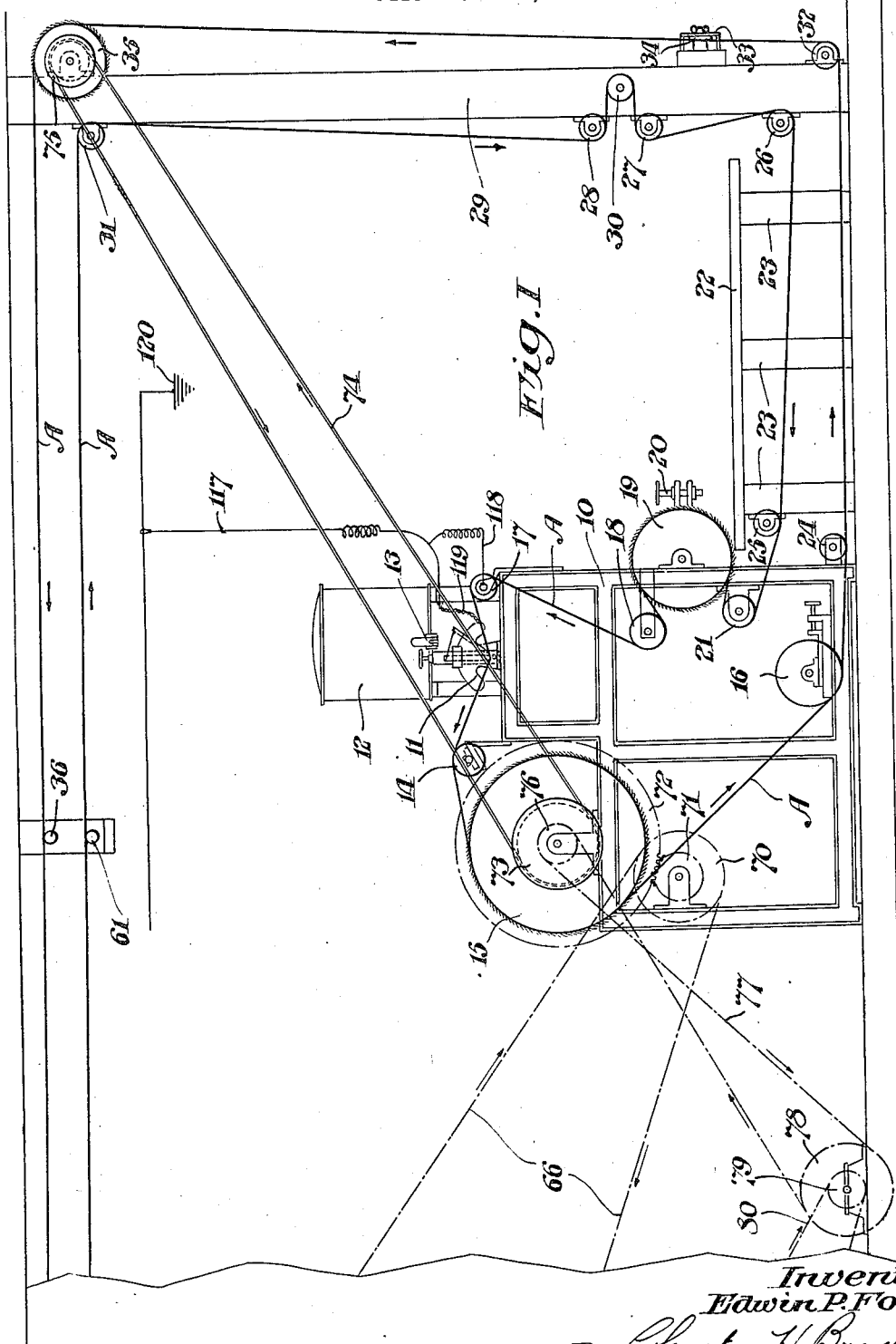
Inventor:
Edwin P. Ford,
By Chester H. Braselton
Attorney.

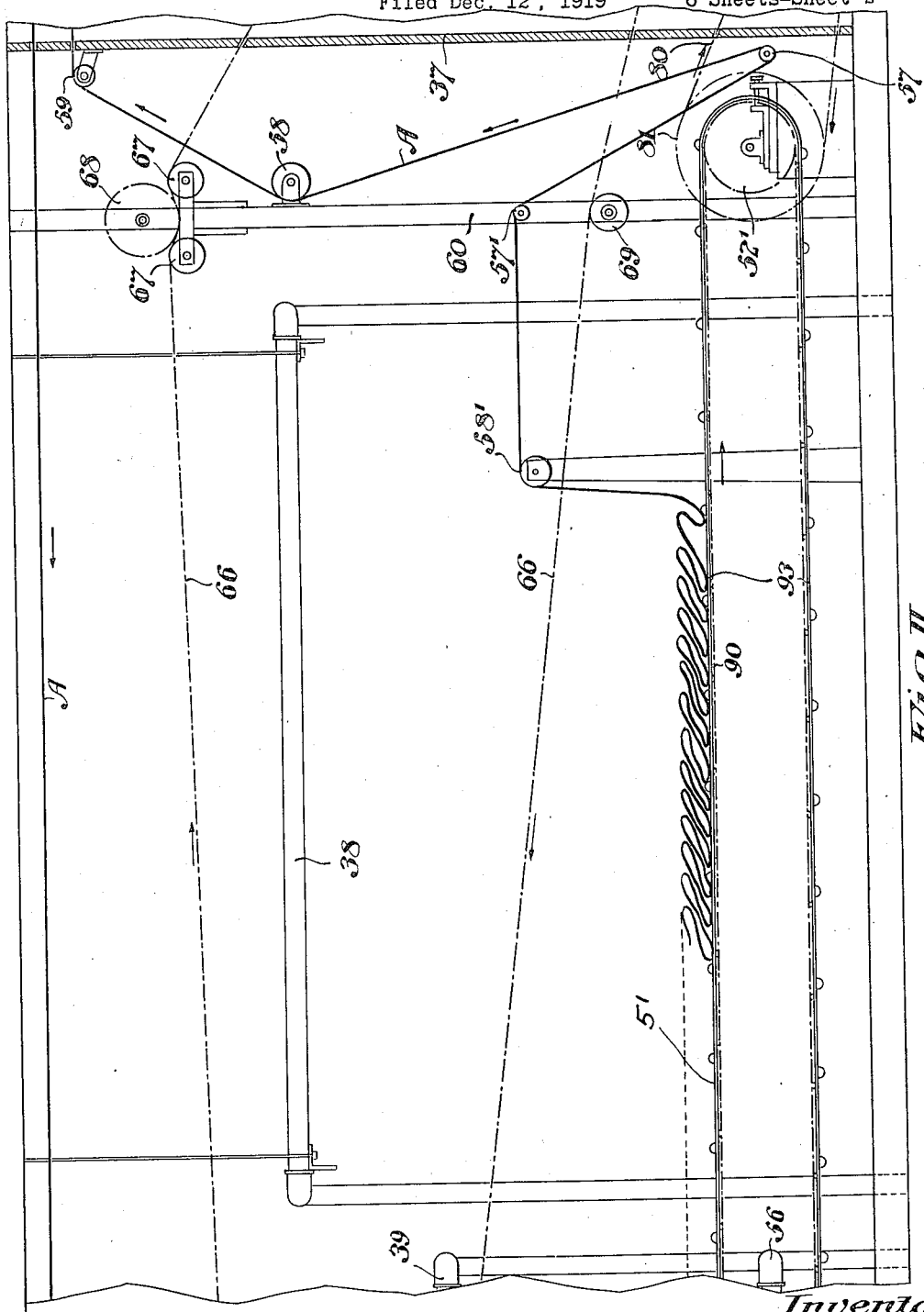

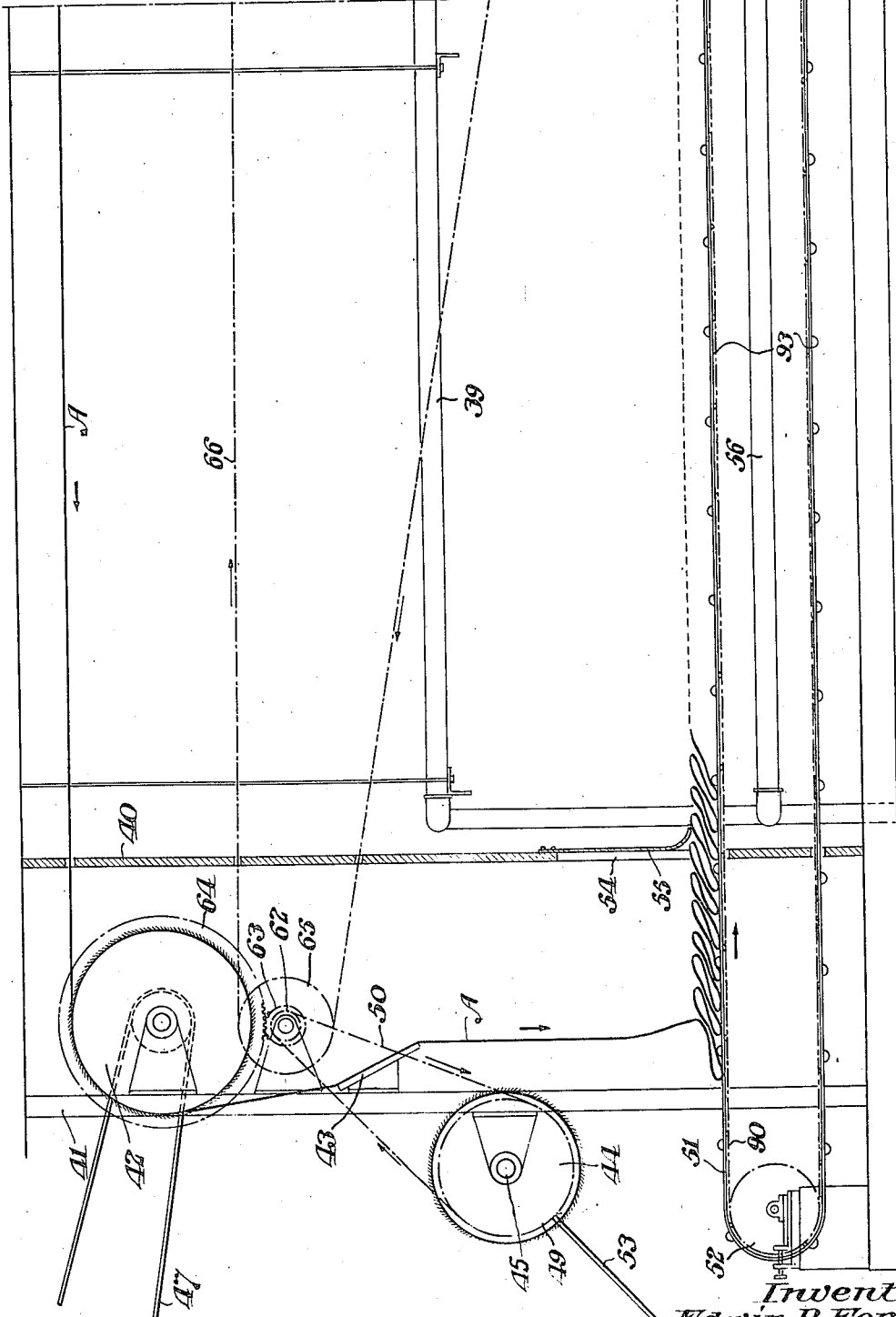

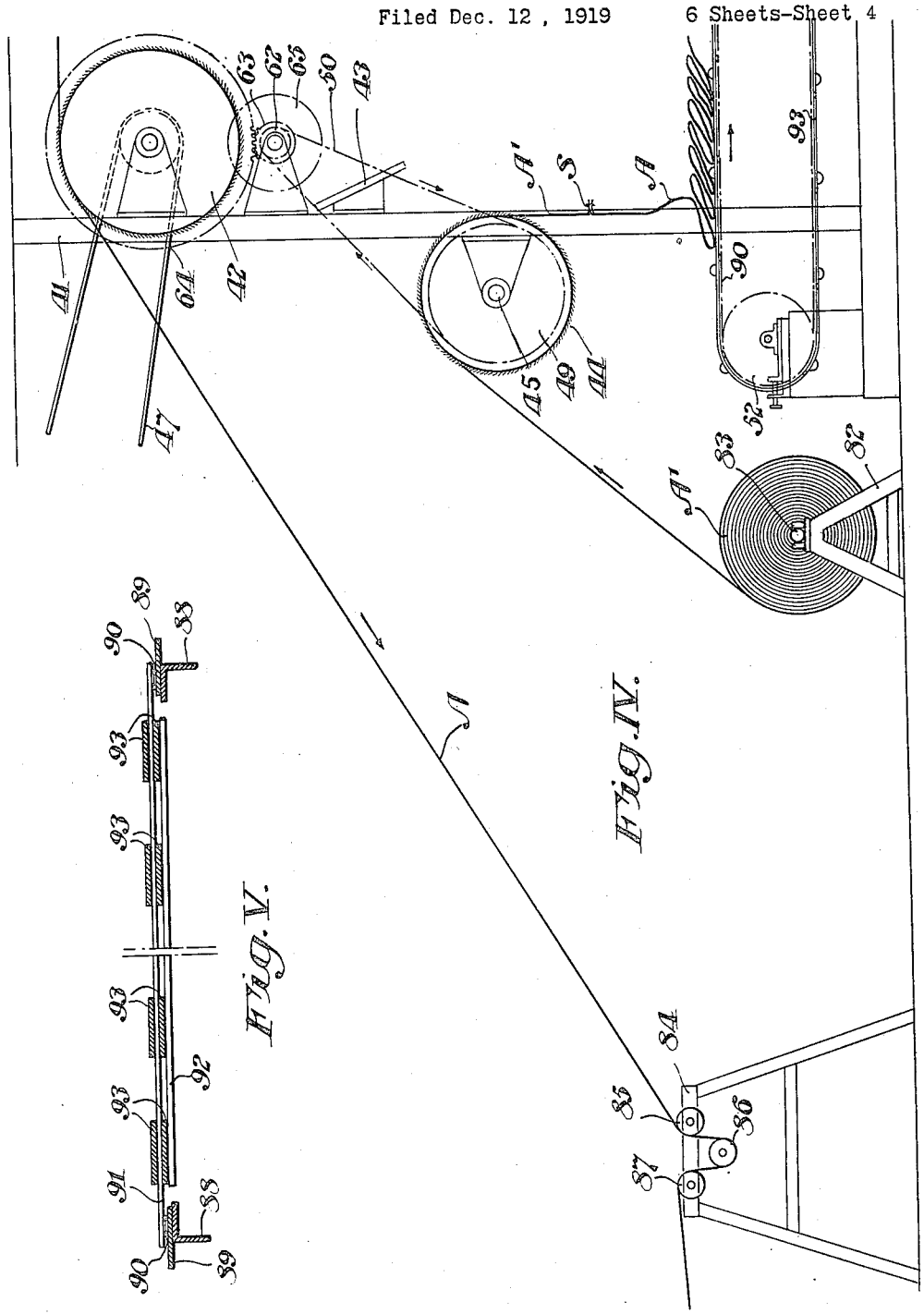

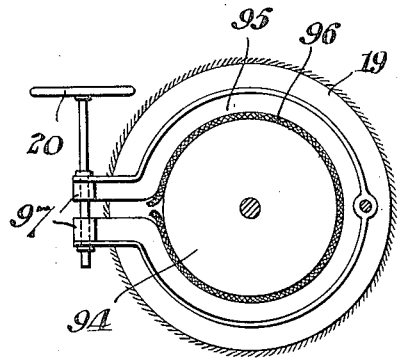
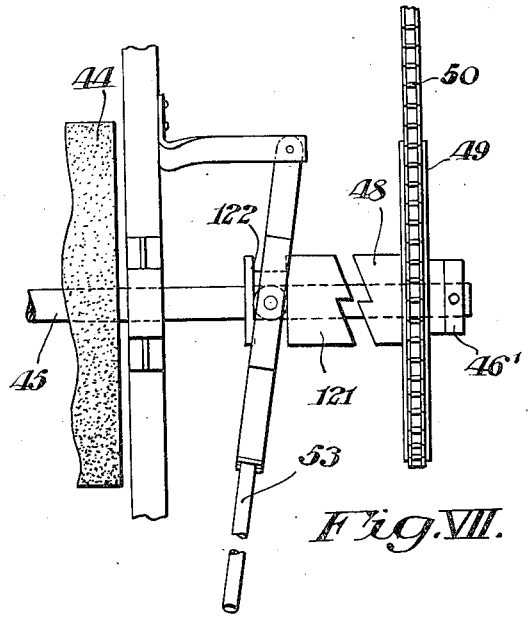
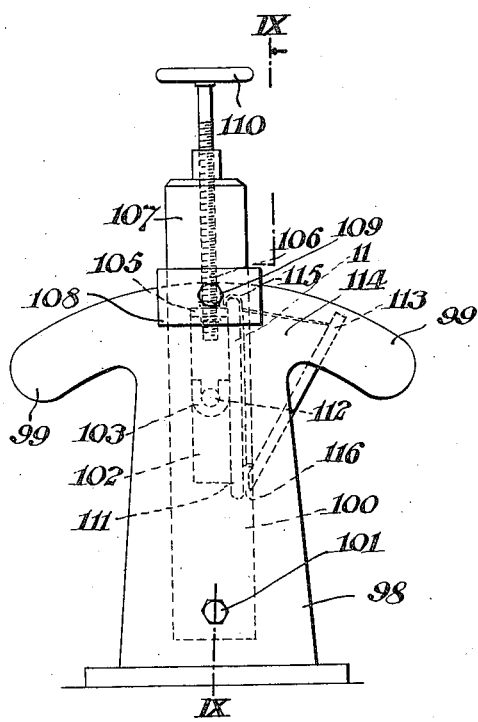
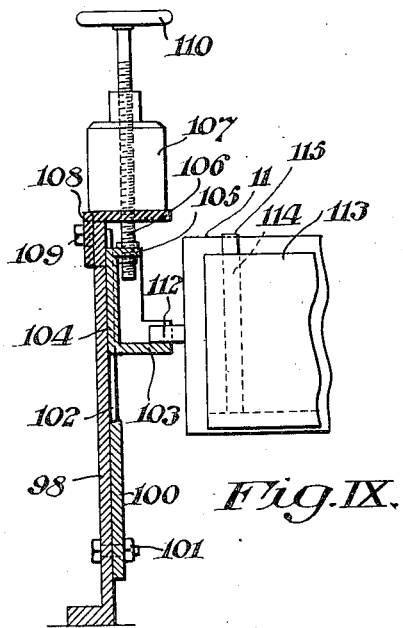

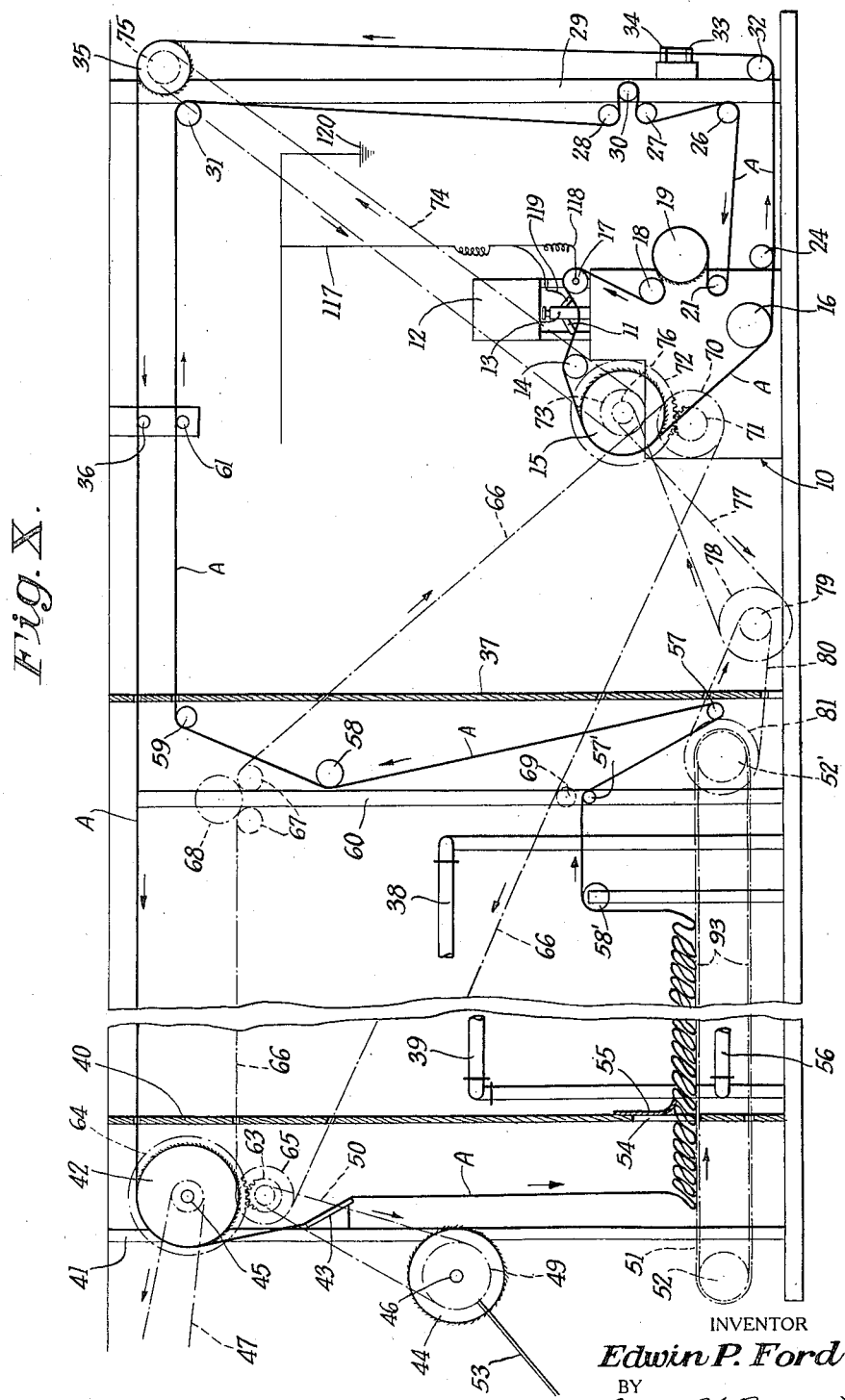

Patented Apr. 15, 1924.

1,490,100

UNITED STATES PATENT OFFICE.

EDWIN P. FORD, OF EAST ORANGE, NEW JERSEY.

MACHINE FOR TREATING OR PROCESSING FABRICS AND OTHER GOODS.

Application filed December 12, 1919. Serial No. 344,327.

*To all whom it may concern:*

Be it known that I, EDWIN P. FORD, a citizen of the United States, residing at East Orange, New Jersey, have invented certain new and useful Improvements in Machines for Treating or Processing Fabrics and Other Goods, of which I declare the following to be a full, clear, and exact description.

This invention relates to an improved machine for treating or processing fabrics and other goods. This invention as herein particularly set forth embodies a coating or spreading machine such as may be used for coating or spreading a pyroxylin composition on fabrics in the manufacture of artificial leather and similar materials.

One of the chief objects of my invention is to provide a machine of this nature in which the same fabric may be given several coats without removing it from the machine, each coat being dried before the succeeding coat is applied.

Another object of my invention is to provide a machine in which the coating process is substantially continuous, it not being necessary to stop the coating operation when a new batch of fabric is fed into the machine, thus resulting in a machine which has a largely increased production over other coating machines with which I am familiar.

Further objects, and objects relating to economies of operation and production and details of construction, will definitely appear from the detailed description to follow. I accomplish the objects of my invention by the devices and means described in the following specification. My invention is clearly defined and pointed out in the appended claims. A structure, which may be a preferred embodiment of my invention, is illustrated in the accompanying drawing, forming a part of this specification, in which:—

Figure I is a view in side elevation of the head of the machine, the frame work and corresponding parts being shown in light lines.

Figure II is a view in side elevation of the central portion of the machine.

Figure III is a view in side elevation of the foot of the machine.

Figure IV is a view in side elevation corresponding to a part of Figure III, but showing a batch of coated fabric being removed from the machine, and a fresh batch of fabric being delivered to the machine.

Figure V is a detail, sectional view through the creeping apron and the track therefor, showing the details of construction of these parts.

Figure VI is a view in end elevation of the tension roll shown in Figure I, showing the braking means thereon.

Figure VII is a plan view of a portion of the roll for delivering fabric to the conveyer, showing the driving means and clutch mechanism associated therewith.

Figure VIII is a view in end elevation of the doctor or spreading knife and its adjustable support, and Figure IX is a detail, sectional view taken on the line IX—IX of Figure VIII.

Figure X is a view in side elevation of the entire machine.

In the drawings, similar reference numerals refer to similar parts throughout the several views, and the sectional view is taken looking in the direction of the little arrows at the ends of the section line.

Considering the numbered parts of the drawings, I have shown a machine (see Fig. 1) comprising a frame 10, on which a doctor or spreading knife 11 is mounted, as will be described in further detail hereinafter. A container 12 for the pyroxylin dope to be spread on the fabric is supported so that the dope will run from the nozzle 13 of the container in front of the doctor or spreading knife. An idler roll 14 is journaled on the frame 10 in the rear of the doctor, and a driven drag roll 15, the surface of which is covered with carding clothing, is also journaled on the frame 10 in the rear of the doctor. The idler roll 16 is journaled on an adjustable support in the base of the frame 10. A tension roll 19 is journaled in the frame 10 in front of the doctor, its surface being provided with carding clothing, and braking means 20 being associated with said roll. Idler rolls 17 and 18 are journaled in the frame 10 between the tension roll 19 and the doctor 11, and another idler roll 21 is journaled in the frame 10 below the tension roll 19.

A platform 22 extends in front of the frame 10, being supported by the members 23, and a number of idler rolls 24, 25, and 26 are journaled beneath the platform 22. In front of the platform 22, are the rigid uprights 29, on one side of which are journaled the idler rolls 26, 27, 28, and, 31, while a tension rod 30 extends between the uprights 29, and is located between the rolls 27 and 28. An idler roll 32 is journaled on the the uprights 29, adjacent the feet thereof, and a driven lifting roll 35, the surface of which is covered with carding clothing, is journaled at the upper ends of the uprights 29. The uprights 29 carry a smoothing bar 33 in suitable supports 34. A rod 36 is suitably supported over the frame 10 and the fabric A passes over the rod as it leaves the lifting roll 35.

The frame or head of the machine is near the partition 37 (see Fig. 11) of the drying chamber within which are disposed the steam coils 38 and 39. The solvent used in the pyroxylin dope usually comprises hydrocarbon compounds, which are rather volatile, and have pungent odors which, in some cases, may be rather deleterious, and, therefore, the drying or evaporating of the solvent is carried on in a chamber which is separated from the operating parts of the machine as much as possible. After the fabric has passed by the coils 38 and 39, it passes out of the drying chamber through an opening formed in the partition 40, (Figs. III and IV).

A drag roll 42, the surface of which is covered with carding clothing, is rotatively mounted in suitable supports extending from the uprights 41. Just below this drag roll 42, there is an inclined surface 43 which serves to direct the fabric from the drag roll 42 downward on to the creeping conveyor which will be described hereinafter. The drag roll 42 is driven by a belt 47 which is connected with any suitable source of power. Another drag roll 44 is mounted on a shaft 45, and a sprocket wheel 49 is loosely mounted on the end of said shaft, being retained thereon by a collar 46', and being driven by a chain 50, as will be described hereinafter. A clutch member 48 is connected with the sprocket wheel 49 and co-operates with another clutch member 121 which is splined to the shaft 45, so as to be movable axially thereof, but non-rotatable relative thereto. The clutch member 121 is actuated by the lever 53 carrying a roller engaging in a suitable groove 122 in the clutch member 121.

In the lower portion of the partition 40, there is formed an opening 54, which is partly closed by a flexible strip of fabric 55, and the creeping apron or conveyor 51 passes through said opening 54. The chains 90 forming a part of said apron run over sprockets 52 adjustably supported adjacent the uprights 41. Within the drying chamber there are provided a series of steam coils 56, disposed between the lengths of the conveyor. Adjacent the wall 37, and within the drying chamber, there are adjustably journaled the sprocket wheels 52, over which the conveyor chains 90 pass.

An idler roll 58' is suitably journaled above this end of the conveyor, and a rod 57' extends between the uprights 60. A tension rod 57 is supported adjacent the sprocket wheels 52', and another idler roll 58 is journaled on the uprights 60 above the sprocket wheel 58'. An idler roll 59 is journaled in suitable supports extending from the upper part of the partition wall 37. The fabric coming from the drying chamber passes over the roll 59, and a rod 61, supported in line with the rod 36.

The chain 50, which is driven by the sprocket wheel 49, runs over the sprocket wheel 62, which drives a gear 63, meshing with the large gear 64, which turns with the drag roll 42. A sprocket wheel 65 turns with the gear 63, and a sprocket chain 66 runs over the sprocket wheel 65, said sprocket chain 66 extending through the drying chamber to the head of the machine where it runs over the sprocket wheel 70, journaled in the frame 10. Within the drying chamber, the sprocket chain 66 engages the idler sprocket wheels 67, 68, and 69, which keep it properly tensioned. The sprocket wheel 70 drives the gear 71, which meshes with a large gear 72 driving the drag roll 15, and also driving a pulley 73 connected by belt 74 with a pulley 75, which drives the lifting roll 35. The gear 72 also drives the pulley 76, which is connected by a crossed belt 77 with a pulley 78, driving a sprocket wheel 79 which drives a chain 80 running over a large sprocket wheel 81, which drives the sprocket wheels 52', thus driving the conveyor chains 90.

At the foot of the machine, adjacent the end of the conveyor, there are provided suitable standards 82 in which a roll 83 carrying a fresh batch of fabric may be journaled. At the same end of the machine, there is provided a take-off mechanism 84, comprising the idler rolls 85, 86, and 87.

The creeping conveyor comprises a stationary track 89 mounted on angle bars 88. The chains 90 ride on these tracks and the cross slats 91 are connected at their ends to said chains. A plurality of longitudinally extending webs of fabric or belting are secured to the cross slats 91 and the cross slats 92 are secured to the lower surfaces of the lower webs 93.

The tension roll 19 has a pulley 94, at one end thereof, which is engaged by a split brake band 95 furnished with a lining of braking material 96, the friction being applied by the screw 20 cooperating with the extending ears 97.

The knife or doctor 11 comprises a pair of standards 98 mounted on frame 10, the upper ends of said standards being arcuate in form and including the extending ears 99. The strap 100 having a slide way 102, is pivotally connected at its lower end to the standard 98 by the bolt 101 and cradle 104 is slidably mounted on the way 102 and has a laterally extending socket 103 and a laterally extending flange 105 connected to the end of an adjusting screw 106. This screw is threaded in a block 107, at the end of strap 100 and having an extending flange 108, which overhangs the top of the standard 98 and may be clamped against the standard by a set screw 109. The adjusting screw 106 may be manipulated by the hand wheel 110. The doctor or spreading knife 11 has projecting trunnions 112, at each end, which rest in the sockets 103. A dam 113, having end plates 114, is supported against the knife 11 by the hooks 115 which engage over the upper edge of the knife, and the lower edge of the dam 113 is spaced somewhat from the knife, so as to provide the slot 116. The dope flows from the container 112 into the trough formed by said dam and backs up therein and is fed uniformly to the surface of the fabric through the slot 116. This results in a more uniform application of the dope to the fabric.

From the description of the mechanism given above, the operation of this machine should be very clearly understood. When the machine is first started, a batch of fabric is fed from a roll 83, supported in standards 82, over the driven drag roll 44 which delivers the fabric to one end of a creeping conveyor or apron 51. This apron extends through the drying chamber and moves at a rate of travel very much slower than the drag roll so that the fabric lies in folds on said apron, as illustrated in the drawings. At the head end of the apron, within the drying chamber, the fabric passes over idler 58' and rod 57', and then passes around the tension rod 57, thence around the idler roll 58, over the idler roll 59 through an opening in the partition 37, and over rod 61 and idler roll 31. The fabric passes around the idler rolls 31 and 28, tension rod 30, idler rolls 27 and 26 underneath the platform 22 and around the idler rolls 25 and 21 to the tension roll 19. This tension roll is provided with suitable braking means by which a frictional resistance may be applied to the turning of the roll, and due to the carding clothing on the surface of the roll, this acts to keep the fabric at the proper tension as it passes beneath the doctor. The fabric passes around the tension roll 19 and idler rolls 18 and 17, and thence beneath the doctor or spreading knife 11. As it passes beneath the knife, a coating of dope is applied to the fabric, the dope flowing from the trough formed by the dam 113 through the slot 116. From the knife, the fabric passes over the idler roll 14, around the driven drag roll 15, thence around the idler rolls 16, 24, and 32, and past the smoothing bar 33, which removes any surplus dope and insures a smooth surface. The fabric now passes to the lifting roll 35, and around said lifting roll, over the rod 36 and through an opening in the partition 37 into the drying chamber. The fabric passes completely through the drying chamber being spread out to its full length, and under some tension, in which condition it passes over the heating coils 38 and 39, and through an opening in the partition 40 to the drag roll 42.

We will assume that the machine has been threaded and, when the first end of the fabric reaches the drag roll 42, the entire batch of fabric to be treated has been delivered by the roll 44 to the conveyer 51, and that which has not been run through the coating mechanism lies in folds on said conveyer. The lever 53 is actuated to disconnect clutch 121 so that drag roll 44 is not driven with sprocket wheel 49. The coated fabric A is led down over the inclined surface 43, and joined by a seam to the rear end of the batch of fabric, thus making a continuous length of fabric which may be passed through the coating mechanism continuously and repeatedly, until the proper number of coatings have been applied. When the proper number of coatings have been applied to the fabric, the seam joining the ends of the fabric in a continuous length is cut below the drag roll 42 and the fabric is delivered to the take off mechanism 84 and passed around the rolls 85, 86, and 87, and may be delivered thence to other machines for additional operations, as, for instance, the embossing operation, which very often follows this coating operation. A new batch of fabric A' is brought from a roll 83, on the standards 82, over the roll 44, which is again connected with the driving mechanism, and connected by a seam S to the tail end of the fabric A on the conveyer 51, so that the process is continuous, and the coating operation does not need to be stopped to introduce a new batch of fabric into the machine. It will be noticed that the fabric is not under any tension between the drag roll 42 and the conveyer 51, and that, in taking off the fabric, and feeding in new fabric, these operations are performed at a point where the fabric is not under any tension. This has important advantages, as the taking on or off of the fabric does not interfere with the tension of the fabric passing through the machine. As soon as the fabric A has passed through the machine and received its final coating and the seam S comes over the drag roll 42, the seam is cut, and the front end of the batch of fabric A' is fastened to the tail end of this batch of fabric which is upon the conveyer 51.

It will be noted that the tension or pull, which carries the fabric under the doctor, is applied by the drag roll 15, which is very close to the knife, and hence this tension does not exist through a long stretch of the fabric. The lifting roll 35 supplies the pull to take the fabric from the drag roll 15, to the lifting roll 35, and the drag roll 42 supplies the pull necessary to carry the fabric through the drying chamber. This pull is comparatively slight, and hence, the fact that there is a comparatively long stretch of fabric between the roll 42 and the lifting roll 35, does not result in any disadvantage. The arrangement of drag rolls which I have described has considerable advantages over other machines with which I am familiar, in which a single drag roll pulls the fabric past the drying means and under the doctor. The result is that the fabric is under so much tension that it will be injured unless it is comparatively heavy. By the use of my arrangement, I can operate on a much lighter weight fabric, without injury, and can also make the drying distance greater.

The operation of the machine tends to generate considerable static electricity, and it is important to dispose of this static charge. I therefore provide a wire 117 connected with a chain 119 which collects all static charge from the fabric just in front of the knife 11 and a wire 118 connected to the journal of the idler roll 17. This wire 117 is connected to a suitable ground 120.

This machine has numerous advantages, the most important of them resulting from the fact that the coating operation is made continuous, and no lost time is necessary for taking on new fabric, or removing the coated fabric. The result is that the production from this machine is considerably greater than that from other machines with which I am familiar, and the labor cost is not increased. An additional advantage resides in the fact that I am enabled to work advantageously with lighter fabric.

It is to be understood, that while I have herein shown and described my invention as particularly adapted for treating fabrics with coats of certain materials, the apparatus may also be applied to other uses for processing and finishing different kinds of goods. or instance, it may be employed in the dyeing art, or for lustering and finishing fine textiles, without material change in its arrangement except as regards the specific processing means itself.

I am aware that the particular embodiment of my invention which I have shown and described here, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. A machine of the class described comprising the combination of coating means, drying means, and means for carrying a fabric to be coated continuously and repeatedly past said coating means and drying means including a driven drag roll adjacent to and in the rear of said coating means and a driven conveyor positioned below said fabric carrying means moving relatively slower than said drag roll for returning fabric to said coating means in a loose state.

2. A machine of the class described comprising the combination of coating means, drying means, and means for carrying a fabric to be coated continuously and repeatedly past said coating means and drying means, including a drag roll adjacent to and in the rear of said coating means and a creeping apron positioned below said fabric carrying means on which surplus fabric is adapted to lie in folds for delivering fabric to said coating means.

3. A machine of the class described comprising the combination of coating means, a drying chamber, and means for carrying a fabric to be coated continuously past said coating means and through said drying chamber including a creeping conveyor extending within said drying chamber.

4. A machine of the class described comprising the combination of coating means, a drying chamber, means for carrying a fabric past said coating means, means for carrying the freshly-coated fabric through said drying chamber, and means for returning said fabric to said coating means including a creeping conveyor extending within said chamber.

5. A machine of the class described comprising the combination of coating means, drying means, means for continuously carrying a fabric to be coated past said coating means, including a drag roll adjacent to and in the rear of said coating means, means for carrying the freshly-coated fabric past said drying means, and means for returning said fabric to said coating means including a creeping conveyor.

6. A machine of the class described comprising the combination of a drying chamber, a creeping conveyor extending within said chamber, a drag roll at one end of said conveyor adapted to deliver fabric thereto, coating mechanism at the other end of said conveyor including a spreading knife and a drag roll adjacent to and in the rear of said knife and adapted to draw the fabric from said conveyor and past said knife, and means for delivering the fabric from said last mentioned drag roll to the first-mentioned drag roll.

7. A machine of the class described comprising the combination of a drying chamber, a creeping conveyor extending within said chamber, a drag roll at one end of said conveyor adapted to deliver fabric thereto, coating mechanism at the other end of said conveyor including a spreading knife and a drag roll adjacent to and in the rear of said knife and adapted to draw the fabric from said conveyor and past said knife, and a lifting roll, said fabric passing from said last-mentioned drag roll to said lifting roll and from said lifting roll through said chamber to the first-mentioned drag roll.

8. A machine of the class described comprising the combination of a drying chamber, a creeping conveyor extending within said chamber, a drag roll at one end of said conveyor delivering the fabric thereto, a coating mechanism at the other end of said conveyor including a spreading knife, a drag roll adjacent to and in the rear of said knife, and a tension roll in advance of said knife, said drag roll drawing the fabric from the conveyor over said tension roll and past said knife, and a lifting roll, said fabric passing from said last-mentioned drag roll to said lifting roll and from said lifting roll through said chamber to said first-mentioned drag roll.

9. A machine of the class described comprising the combination of coating means, a driven drag roll adjacent to and in the rear of said coating means, a drying chamber, and means including a creeping conveyor on which excess fabric is loosely carried without tension for carrying the fabric to be coated through said chamber and returning it to the coating means.

10. A machine of the class described comprising the combination of coating means, a drying chamber, and means for carrying the fabric to be coated through said chamber and returning it to the coating means, including a creeping conveyor in said chamber on which excess fabric is loosely carried without tension.

11. A machine of the class described comprising the combination of coating means, a drying chamber, means for carrying the fabric from said coating means through said chamber under tension, and means for returning the fabric through said chamber to said coating means without tension.

12. A machine of the class described comprising the combination of coating means, a drying chamber, a creeping conveyor adapted to pass through the drying chamber, a drag roll carrying fabric from said coating means through said drying chamber and normally delivering said fabric without tension to said conveyor, and take-off means adjacent said drag roll.

13. A machine of the class described comprising the combination of coating means, a drying chamber, a drag roll carrying fabric from said coating means through said drying chamber and normally delivering said fabric without tension to said conveyor, and means adjacent said drag roll for taking a coated batch of fabric from said drag roll and delivering a fresh batch of fabric to said conveyor.

14. A machine of the class described comprising the combination of coating means, drying means, means for delivering fabric to said coating means, including a creeping conveyor extending past said drying means, and a driven roll for delivering a fresh batch of fabric to said conveyor.

15. A machine of the class described comprising the combination of coating means, means for delivering fabric to said coating means, including a creeping conveyor, a roll for delivering a fresh batch of fabric to said conveyor, driving means for said roll, and clutch means between said driving means and said roll.

16. A machine of the class described comprising the combination of a frame, a spreading knife carried thereby, a driven drag roll journaled therein, a tension roll journaled therein, a platform in front of said frame, means for delivering fabric to said knife including a creeping conveyor, drying means, and means for drawing fabric from said coating means past said drying means and delivering said fabric to said conveyor, said fabric passing beneath said platform as it goes to and comes from the coating means.

17. A machine of the class described comprising the combination of a frame, a spreading knife carried thereby, a driven drag roll journaled therein, a tension roll journaled therein, drying means, a platform in front of said frame, a standard in front of said platform, a plurality of idler rolls journaled on said standard, a lifting roll journaled on said standard, means for delivering fabric to said tension roll, including a creeping conveyor, said fabric passing around said idler rolls and beneath said platform, and means for drawing fabric from said drag roll past said drying means and delivering said fabric to said conveyor, said fabric passing beneath said platform and around said lifting roll.

18. In a machine of the class described, the combination of a knife, a dam inclined at an angle to said knife, the lower edge of said dam being spaced from said knife to form a delivery slot, end walls carried by said dam and extending between said dam and said knife, and hooks carried by said end walls and engaging the upper edge of said knife.

19. In a machine of the class described, the combination of a frame, a pair of standards carried thereby, a knife supported by said standards and angularly and vertically adjustable relative thereto, and a dam removably supported on said knife, the lower edge of said dam being spaced from said knife to form a delivery slot.

20. In a machine of the class described, the combination of a frame, a pair of standards carried thereby, a strap pivotally mounted on each standard and provided with a way extending longitudinally thereof, means for clamping said straps to said standards, knife-supports adjustably mounted in each of said ways, and a knife mounted on said supports.

21. A machine of the class described comprising the combination of coating means, drying means, means for carrying a fabric to be coated continuously past said coating means including drag means acting on the fabric adjacent to and in the rear of said coating means, and means including a second drag roll for drawing a fabric past the drying means and returning it to the coating means in a loose state.

22. A machine of the class described comprising the combination of coating means, drying means, and means for carrying a fabric to be coated past said coating means and drying means including drag means acting on the fabric adjacent to and in the rear of said coating means and a driven conveyor positioned below said fabric carrying means moving relatively slower than said drag means for returning fabric to said coating means in a loose state.

23. A machine of the class described comprising the combination of fabric-treating means, drying means, and means for continuously carrying a fabric to be treated past said treating means and drying means including drag means acting on said fabric adjacent to and in the rear of said treating means and a driven conveyor positioned below said fabric carrying means moving relatively slower than said drag means.

24. A machine of the class described comprising the combination of fabric treating means, drying means and means for carrying a fabric to be treated continuously past said treating means and drying means, including drag means acting on said fabric adjacent to and in the rear of said treating means and a creeping apron positioned below said fabric carrying means on which surplus fabric is deposited in folds.

25. A machine of the class described comprising the combination of fabric-treating means, a drying chamber, means including a drag roll for carrying a fabric past said treating means, means under tension including a second drag roll for carrying treated fabric through said drying chamber, and means for returning said fabric to said treating means including a creeping conveyor extending within said chamber.

In testimony whereof, I affix my signature.

EDWIN P. FORD.